United States Patent Office.

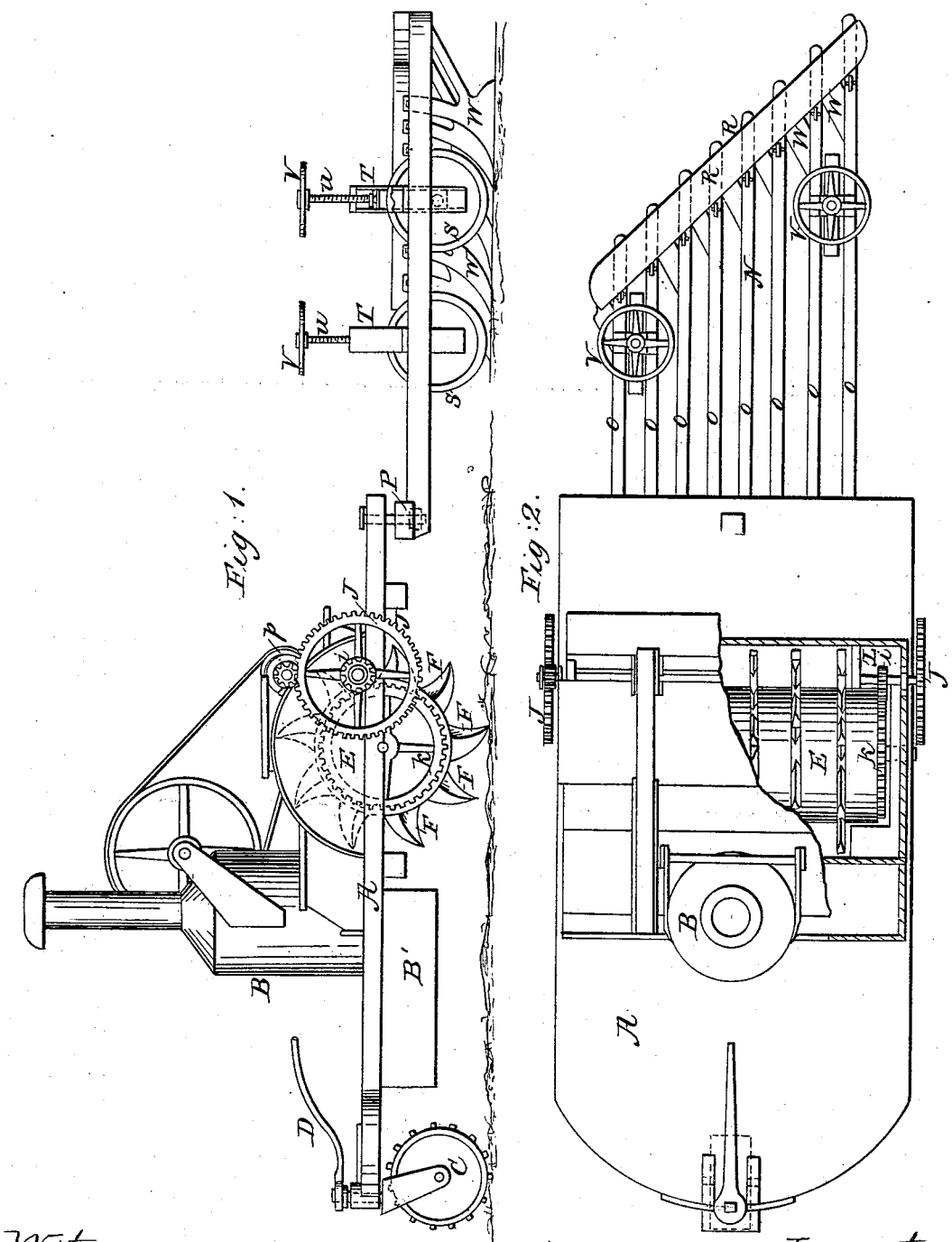

S. B. WILKINS OF MILTON, PENNSYLVANIA.

Letters Patent No. 90,799, dated June 1, 1869.

IMPROVEMENT IN STEAM-PLOWS.

The Schedule referred to in these Letters Patent and making part of the same.

*To all whom it may concern:*

Be it known that I, S. B. WILKINS, of Milton, in the county of Northumberland, and State of Pennsylvania, have invented a new and useful Improvement in Steam-Plows; and I do hereby declare that the following is a full, clear, and exact description thereof, which will enable others skilled in the art to make and use the same, reference being had to the accompanying drawings, forming part of this specification.

This invention relates to new and useful improvements in propelling plows by steam; and consists mainly in the method of obtaining leverage or hold upon the ground for drawing the plows, it being done usually by the traction of wheels on the surface.

It also consists in the general construction and arrangement of the machine, as will be hereinafter more fully described.

In the accompanying plate of drawings—

Figure 1 represents a side elevation of the machine complete.

Figure 2 is a top, or plan view, partly in section.

Similar letters of reference indicate corresponding parts.

A is the platform, upon which the steam-boiler and engine B is placed.

B' is the water-tank.

C is the forward, or steering-wheel, which may be operated by the tiller D, or from the rear end of the machine, by means of ropes and pulleys.

E is the cylinder-wheel, by which I obtain a hold upon the ground for drawing the plows. This cylinder may be made solid, with the teeth F driven in, or hollow, with the shanks of the teeth secured by screw-nuts on the inside.

These teeth are placed in rows around the surface of the cylinder, as seen in fig. 2. They are hooked in form, with sharp cutter-edges on their upper front parts, for cutting roots and cleaning themselves of other obstructions. These teeth penetrate the ground as the cylinder revolves, sufficiently far to obtain a hold and drag the gang of plows after them.

The cylinder E is revolved by means of the belt G, from the engine, and pinions $h$, which mesh into the gear-wheels J and K, the wheels K being attached to the ends of the cylinder, and J J being on the counter-shaft L, the arrangement for driving being seen where the drawing, fig. 2, is shown in section, and also in fig. 1.

The gang of plows is seen attached to the frame N. This frame is composed of a series of beams, $o$, secured together by a cross-timber, P, at their front ends, and by an obliquely-placed cross-timber, R, at their rear ends, to which piece, in connection with the beams, the plows are secured in any substantial manner.

The depth of the plows in the ground is governed by the gauge-wheels S S, which are attached to bails, which slide in the stands T T.

U U are screws, which are attached to the bails, which work through the top of the stands, and are operated by the hand-wheels V V.

The cylinder E may be made in two longitudinal sections, if desired, connected so that they may be revolved either separately or together, by means of a clutch, or otherwise.

The shaft or shafts of the cylinder may extend outside the frame, so that broad-faced gauge-wheels may be placed thereon for governing the depth of the teeth in the ground.

The speed of the machine may be increased or diminished by using pinions of different sizes on the counter-shaft L.

W represents the plows, of which there may be more or less, as may be desired.

It will be observed that the weight of the frame, and the parts arranged in connection therewith, will suffice to force the teeth of the cylinder into the earth sufficiently far to allow the periphery of said cylinder to come in contact with the surface of the soil, and thus enable the same to act as a "clod or stubble-breaker," on what is termed, among farmers, "old ground."

I desire it to be understood that I do not limit myself to the number of plows employed, as that will depend entirely upon the character of the soil, which may, in some cases, be so firm as to render it difficult to use more than one plow.

I also desire to state that I propose to use teeth in connection with the cylinder, which shall be of any desired length, in conformity to the character of the soil. If, however, it be intended that the plows shall open a furrow from seven to eight inches in depth, it will probably be found most expedient to employ teeth of fifteen or sixteen inches in length.

By frequent plowing or harrowing a field with this machine, it will become gradually subsoiled to the extent of the penetration of the teeth, without the ordinary bad effect produced by a subsoil-plow, since the teeth do not bring large quantities of the poor subsoil to the surface.

Having thus described my invention,

I claim as new, and desire to secure by Letters Patent—

1. In combination with the cylinder E, the frame N, plows W, and gauge-wheels S S, arranged substantially as described, for the purposes set forth.

2. The employment, in a steam-plow, of one or more plows, arranged in line with rows of teeth upon a rotating cylinder, substantially as and for the purpose specified.

3. The combination of the plows W with the gauge-wheels S, stands T, and screw-rods U, provided with the hand-wheels V, substantially as herein described, for the purpose set forth.

The above specification of my invention signed by me, this 1st day of March, 1869.

S. B. WILKINS.

Witnesses:
  FRANK BLOCKLEY,
  ALEX. F. ROBERTS.